United States Patent
Bertoldi et al.

(10) Patent No.: US 11,784,581 B2
(45) Date of Patent: Oct. 10, 2023

(54) CONVERTER

(71) Applicant: ABB Schweiz AG, Baden (CH)

(72) Inventors: Federico Bertoldi, Västerås (SE); Kalle Ilves, Västerås (SE); Nan Chen, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/644,495

(22) Filed: Dec. 15, 2021

(65) Prior Publication Data

US 2022/0247324 A1    Aug. 4, 2022

(30) Foreign Application Priority Data

Dec. 21, 2020 (EP) .................................. 20215868

(51) Int. Cl.
*H02M 7/487* (2007.01)
*H02M 7/483* (2007.01)
(Continued)

(52) U.S. Cl.
CPC ......... *H02M 7/487* (2013.01); *H02M 7/4815* (2021.05); *H02M 7/539* (2013.01); *H02M 7/4835* (2021.05); *H02M 7/4837* (2021.05)

(58) Field of Classification Search
CPC ... H02M 7/487; H02M 7/4835; H02M 7/4837
See application file for complete search history.

(56) References Cited

U.S. PATENT DOCUMENTS 5,949,669 A * 9/1999 Bruckmann .............. B60L 9/16
363/136

9,525,348 B1 * 12/2016 Aeloiza ................. H02M 7/48
(Continued)

FOREIGN PATENT DOCUMENTS

CH    708498 A2 *  3/2015  ........ H02M 3/33584
CH    707447 B1 *  7/2017  ............ H02M 3/158
(Continued)

OTHER PUBLICATIONS

Sala, V., et al.; "Multilevel DCI-NPC Power Amplifier High-Frequency Distortion Analysis through Parasitic Inductance Dynamic Model"; Audio Engineering Society (AES) Convention; Convention Paper 7998, Presented at the 128th Convention; London, United Kingdom; May 22, 2010; 8 Pages.

(Continued)

*Primary Examiner* — Gary A Nash
(74) *Attorney, Agent, or Firm* — WHITMYER IP GROUP LLC

(57) ABSTRACT

A converter and a method of operating a converter. The converter comprising a DC link capacitor, an upper arm (S1) and a lower arm (S4) with switching cells in series, an upper switch (S2) and a lower switch (S3). The upper switch (S2) and the lower switch (S3) are connected together and the connection point forming an output voltage terminal (a). The converter comprising further an upper valve component and a lower valve component, which are arranged such that the upper valve component allows current from the center point of the DC link capacitor towards the upper arm and the lower valve component allows current from the lower arm towards center point of the DC link capacitor. A current path through the upper valve component or the lower valve component comprises inductance to form a resonance circuit.

10 Claims, 2 Drawing Sheets

(51) Int. Cl.
  *H02M 7/48*   (2007.01)
  *H02M 7/539*  (2006.01)

(56)     References Cited

U.S. PATENT DOCUMENTS

| | | | | |
|---|---|---|---|---|
| 2008/0204959 | A1* | 8/2008 | Knapp | H02H 7/1225 |
| | | | | 361/100 |
| 2014/0198548 | A1* | 7/2014 | Zhang | H02M 7/487 |
| | | | | 363/131 |
| 2014/0376287 | A1* | 12/2014 | Narimani | H02M 7/483 |
| | | | | 363/60 |
| 2019/0348925 | A1* | 11/2019 | Barupati | H02M 1/0095 |

FOREIGN PATENT DOCUMENTS

| | | | | |
|---|---|---|---|---|
| CN | 106849673 | A | * 6/2017 | |
| JP | 2010252548 | A | * 11/2010 | H02M 1/34 |
| WO | WO-2013135277 | A1 | * 9/2013 | H02M 7/487 |
| WO | WO-2014154265 | A1 | * 10/2014 | H02M 7/487 |
| WO | WO-2019238443 | A1 | * 12/2019 | |

OTHER PUBLICATIONS

Song, Byeong-Mun, El Al.; "A Multilevel Soft-Switching Inverter with Inductor Coupling"; Conference Record of the 2000 IEEE Industry Applications Conference, vol. 37, Issue 2; Thirty-Fifth IAS Annual Meeting and World Conference on Industrial Applications of Elecliical Energy; Rome, Italy; Oct. 8, 2000; 8 Pages.
European Search Report; Application No. EP 20 21 5868; dated May 27, 2021; 1 page.
European Office Action; Application No. 20 215 868.9; dated May 11, 2023; 7 Pages.
U.S. Notice of Allowance; U.S. Appl. No. 17/644,495; dated Jun. 28, 2023; 10 Pages.

* cited by examiner

CONVERTER

FIELD

The invention relates generally to converters, and particularly to a multi-level neutral point clamped converter.

BACKGROUND

Multi-level converters are commonly employed in connection with high voltages when electricity is converted from one form to another. Typical conversions in which converters are employed include direct current (DC) to alternating current (AC) conversion, DC to DC conversion and AC to DC conversion. When operating in high voltages, the converter topologies typically differ from the ones used in connection with lower voltages.

One converter topology for high voltages is modular multilevel converter (MMC) in which a converter phase leg is formed of multiple of series connected switching cells in both upper and lower arm. Each switching cell comprises a capacitor and the voltage of the capacitor can either be by-passed or set in the series connection to provide a desired phase output. The output voltage of a MMC can be changed step-wise by changing the amount of capacitors that are connected in series. The step-wise change of the output voltage enables to produce an output voltage which approximates a sinewave resulting in a low total harmonic distortion (THD). In other converter schemes, the output voltage is formed of a pulse width modulating a DC voltage. Instead of step-wise change in output voltage, the pulses may have a constant amplitude and pulse durations are changed in a modulation period. The effective value of the voltage is determined by the relative lengths of the pulses. In pulse width modulated output voltages the THD can be improved by increasing the number of the voltage levels used in producing the output voltage.

Drawbacks relating to modular multilevel converter relate to the bulky structure as large capacitors are included in each switching cell. The capacitors in an MMC topology serve for storing energy as a DC link is not used in the structure. Further, another drawback of the topology relates to operation with low output frequencies. In low output frequencies, for example if MMC is used for driving a motor, the energy of the capacitors needs to be further increased to sustain the operation.

BRIEF DESCRIPTION

An object of the present invention is to provide a converter circuit and a method of operating a converter circuit so as to alleviate the above disadvantages. The object of the invention is achieved by a method and a converter which are characterized by what is stated in the independent claims. Preferred embodiments of the invention are disclosed in the dependent claims.

The invention is based on the idea of providing a converter circuit, in which multiple switching cells are arranged in converter arms. In the circuit, the output voltage level is selected by connecting a desired number of switching cell capacitors in series. The obtained output voltage level is held for almost a complete switching period. At the end of each switching period all the switching cell capacitors of one arm are inserted in the circuit and resonance situation is obtained. The resonance is stopped with a diode allowing the energy transfer from the switching cell capacitors to the DC link capacitor. The blanking time at the end of each switching period has a constant value and is small compared to the duration of the switching period which enables to obtain good THD.

The capacitors in the switching cells are not operating as energy storages but to shape the output voltage. Therefore the size of the capacitors is minimized when compared to the capacitors in MMC converters. Further, as the DC link capacitors serve as energy storage, the converter can be operated in low frequencies.

BRIEF DESCRIPTION OF THE DRAWINGS

In the following the invention will be described in greater detail by means of preferred embodiments with reference to the attached drawings, in which.

DETAILED DESCRIPTION

Figure 1:
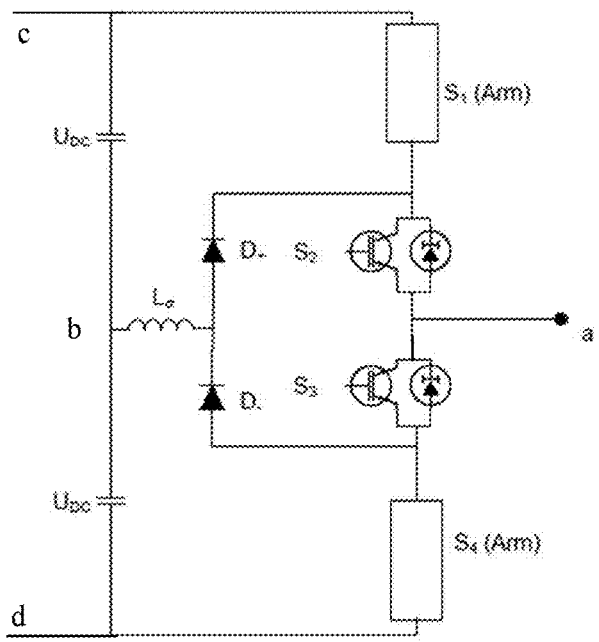
FIG. 1 shows a basic topology of the converter according to an embodiment.

FIG. 1 shows a basic structure of the converter topology according to an embodiment. FIG. 1 shows one phase of the converter and the phase output is formed of point a.

The converter of the embodiment comprises a DC link capacitor having a center point. In FIG. 1 the DC link capacitor with a center point is shown to be consisting of two capacitors connected in series and both capacitors having a voltage $U_{DC}$ and therefore the center point of the DC link capacitor is formed of the point between the capacitors and shown in FIG. 1 as b.

Further, the converter comprises an upper arm S1 and a lower arm S4. The arms comprise switching cells which are connected in series. The switching cells are independently controlled units which comprise a capacitor and a bridge circuit. The bridge circuit in each switching cell enables to by-pass the capacitor of the switching cell or to set it in the series connection.

The converter further comprises an upper switch S2 connected in series with the upper arm and a lower switch S3 connected in series with the lower arm. The upper and lower switches are formed of one or multiple of switch components which may be connected in series. In the following the upper switch and the lower switch are referred to as single components termed an upper switch component and a lower switch component, respectively. The upper and lower switch components S2, S3 have also antiparallel diodes to enable current flow in both directions.

The upper switch component S2 and the lower switch component S3 are connected together and the connection point between the switch components forms the output voltage terminal a.

The series connection of the upper arm S1, the upper switch component S2, the lower switch component S3, and the lower arm S4 is connected in parallel with the DC link capacitor as shown in FIG. 1. As mentioned, the DC link capacitor is formed in the example of FIG. 1 of two capacitors connected in series. DC link is thus formed between points c and d, between which the series connection of the capacitors is connected. The points c and d are also the input terminals of the converter.

Further, the converter comprises an upper valve component and a lower valve component. In the simplest form, the upper and the lower valve components are diodes. However, the valve components may be formed of one or more controllable components, such as switch components including IGBT and MOSFET components. In the following, the upper valve component and the lower valve component are referred to as the upper diode D+ and the lower diode D−.

The upper diode D+ is connected between a point between the upper arm and the upper switch component and the center point of the DC link capacitor. The lower diode D− is connected between a point between the lower arm and the lower switch component and the center point of the DC link capacitor. The polarity of the upper diode allows current from the center point of the DC link capacitor towards the upper arm and the polarity of the lower diode allows current from the lower arm towards the center point of the DC link capacitor. Further, according to an embodiment, a current path through each of the upper diode and the lower diode comprises inductance to form a resonance circuit. Thus when the upper diode or the lower diode is forward biased, the formed current path comprises inductance to form a resonance circuit. In FIG. 1 the inductance $L_\sigma$ is shown as a discrete component which is connected between the series connection of the upper diode D+ and the lower diode D− and the center point of the DC link capacitor.

Figure 2:
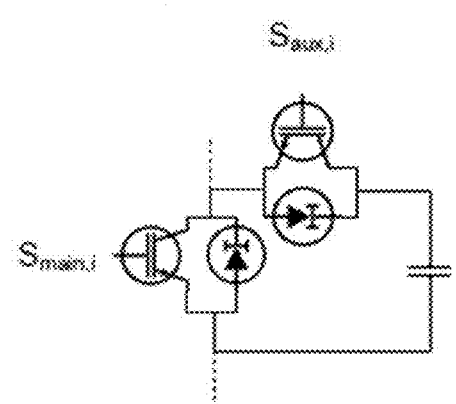
FIG. 2 shows an example of a switching cell.

The upper arm S1 and the lower arm S4 comprises series connection of switching cells. An example of a switching cell is shown in FIG. 2. The switching cell of the example comprises two switch components $S_{main,i}$ and $S_{aux,i}$. The main switch $S_{main,i}$ is in the switch component which is used to by-pass the capacitor in the switching cell. Thus when the main switch conducts, the capacitor is not in the current path. The auxiliary switch $S_{aux,i}$ is used to connect the capacitor in the current path. As mentioned, the arms comprise series connection of switching cells. Thus when multiple of switching cells are connected in series, the number of series connected capacitors can be selected with the switches. Typically the switches of a switching cell are controlled such that only one of the switches is conducting, so that the number of capacitors connected in series can be changed. The cell topology presented in FIG. 2 is a half bridge topology in which two switching components are employed. The switching cell can be implemented also with a full bridge topology. Other topologies may also be used in connection with the switching cell.

In the converter according to an embodiment, the DC voltage is switched to the output a through the upper arm and upper switch component or through lower arm and the lower switch component. The voltage in point a in relation to the center point of the DC link is dependent on the number of active switching cells. With an active switching cell it is referred to a switching cell in which the capacitor is connected to the current path, i.e. $S_{aux,i}$ is conducting and $S_{main,i}$ is blocking. When switching cells are active, their voltage reduces the output voltage. For example, considering that the upper switch S2 is conducting and lower switch S3 is blocking. If all the capacitors in the upper arm are by-passed, then the voltage between the center point of the DC link and the output a is $U_{DC}$ which is the voltage of the half of the DC link. When a switching cell is active in the upper arm S1, the voltage of the point a is reduced by the magnitude of the voltage of the active switching cell. i.e. $U_a = U_{DC} - U_C$, where Ua is the voltage between the center point of the DC link and the output a, $U_{DC}$ is the voltage of half of the DC link and $U_C$ is the voltage of a switching cell capacitor. When multiple of switching cells are active, the voltage of point a is further reduced. Thus with the topology of FIG. 1 the output voltage level can be varied. The number of switching cells is not limited to any specific number. As the number increases, more voltage levels are available at the output a.

Figure 3:
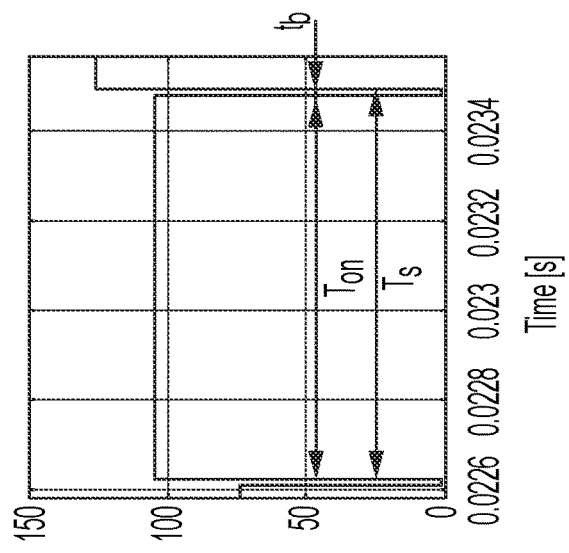
FIG. 3 shows an example of a switching period.

In operation, typically a voltage reference is provided to the converter. The controller of converter operates to fulfil the voltage reference by selecting the required number of switching cells. The switching cells are activated, and a voltage level is produced. As the converter is able to produce different voltage levels, the converter is not operated based on pulse width modulation scheme in which average voltage level in a switching period is obtained by having constant DC link voltage active for a calculated period. Instead, with the converter according to an embodiment a selected voltage level is produced for almost complete switching period as shown in FIG. 3. FIG. 3 shows a switching period $T_s$ which consists of active time or on-time $T_{on}$ and a blanking time $t_b$. FIG. 3 also shows end of previous switching period and beginning of next switching period, and it can be seen that the voltage level is increased in the consecutive switching periods in the example.

The topology of the converter allows thus to select a voltage level and keep it switched to the output for an on-time $T_{on}$ which is a fixed period. Further, the blanking time $t_b$, when the voltage goes to zero, has also a fixed length.

The principle of operation of the converter is based on resonance. In the following example the operation of the converter is explained in a case where the current is outgoing, i.e. through the connection point a to a connected system, and the output voltage is positive. The lower arm is not operated, and in each of its switching cells both main and auxiliary switches are in a blocking state. During on-time Ton, a number of switching cells in the upper arm S1 are inserted so to achieve the desired output voltage at terminal a. Further, the upper switch S2 is conducting and the lower switch S3 is blocking.

Positive diode D+ is negatively biased as soon as a switching cell is inserted or activated in the upper arm S1. As the current is flowing through the upper arm S1, the active cells are charging. At the end of on-time $T_{on}$, all the switching cells that were by-passed are inserted again so that the upper arm S1 is effectively connected in parallel with the DC link voltage $U_{DC}$.

When all the switching cells are inserted, the blanking time $t_b$ begins. The voltage of the switching cells in the upper arm exceed the voltage of the DC link $U_{DC}$, and the positive diode D+ is forward biased and starts to conduct. A voltage drop equal to the difference between the DC link capacitor voltage $U_{DC}$ and the upper arm voltage is seen across the inductance $L_\sigma$ of the current path, and a resonance takes place in the current path formed of the DC-link capacitor, the capacitors of the upper arm, positive diode D+ and the inductance. The circuit is undamped as only resistances of the switching components and connection resistance are in the current path.

In the beginning of the resonance, the current flows through the positive diode D+ and from the upper arm capacitors to the DC link. The resonance current cannot change its direction as the positive diode gets reverse biased. Therefore the resonance lasts for half of the resonance period and stops as the current is blocked.

The resonance period is given by $$T = \frac{2\pi}{\omega} = 2\pi \sqrt{\left(L_\sigma * \left(\frac{1}{n/C_{cell} + 1/C_{dc}}\right)\right)}$$

where $L_o$ is the inductance of the resonance path n is the number of cells in arm $C_{cell}$ is the capacitance of one switching cell $C_{dc}$ is half of the DC link capacitance.

As $L_o$ is small, and $C_{cell}$ is small with respect to $C_{dc}$, the resonance period is much shorter that the switching period, which results in a small $t_b/T_{on}$ ratio. The small ratio means a high output voltage quality.

In the operation, when the blanking time ends, a new modulation is initiated and new voltage level is selected.

In the case of a positive output voltage and an in-going current, the operation of the converter circuit is similar to the above, except that the lower switch S3 is used to conduct the LC resonance and the upper switch S2 is blocking. During on-time $T_{on}$, as the current direction is to the converter, the antiparallel diode of the upper switch S2 is conducting, and the lower switch S3 is in a blocking state. The output voltage is selected again by the amount of active switching cells in the upper arm S1. As the direction of current is towards the converter, i.e. current is flowing to the converter through phase output a, the capacitors in the active switching cells are discharging.

During the blanking time $t_b$ all the cells are inserted and the lower switch S3 is turned on, and the arm S1 is in parallel with the DC link. The resonance takes place through the upper arm S1, lower switch S3, negative diode D– and the inductance. Again, at half of the resonance period the negative diode D– is negatively biased and the lower switch S3 can turn off. The turn off can be carried out without current flowing through the component. At the end of the blanking time, the operation is continued to the next switching period.

Figure 4:
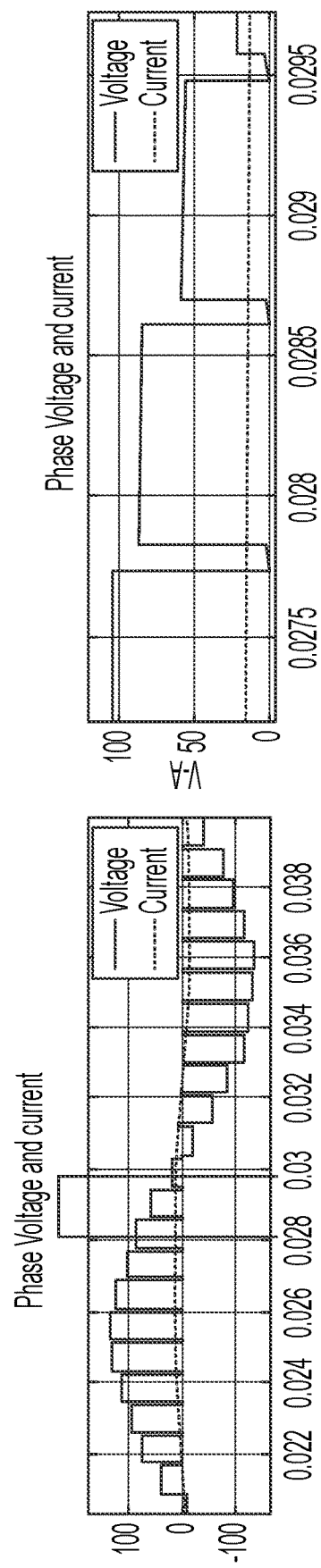
FIG. 4 shows current and voltage waveforms of the converter.

FIG. 4 shows an example of waveforms obtained with the converter according to an embodiment. In the left plot of FIG. 4 voltage and current waveforms are shown for a complete output voltage period. The right plot shows a detailed waveform of the left plot. In the right plot the output voltage is positive and the output current is positive, i.e. out of the converter. As seen, the voltage levels of the pulses are changed to represent a sinewave as a sinewave reference voltage is given. In the right plot is can be seen, how the voltage decreases slightly during the on-time $T_{on}$. The decrease of the voltage level is due to the charging of the active switching cells. Further, during the blanking time the cells voltage is shown to increase. The increase in the voltage is due to the resonance and the fact that the voltage is seen in the circuit across the inductance.

In the example of FIG. 1, the inductance which is needed for the resonance is shown as a discrete inductive component. However, the inductance may be obtained by layout of the circuit or with the combination of the discrete component and the layout. It is known, that each physical circuit has a certain inductive value. This value can be affected by layout considerations in a manner known as such. The requirement for resonance sets the limits for the inductance.

It should also be noted, that in the presented converter topology the balancing of the DC link capacitors can be achieved in a similar manner than in commonly used neutral point clamped (NPC) converters.

In the method of operating the converter according to an embodiment a voltage reference is obtained. Then, it is determined the number of switching cells required to achieve the voltage reference. The determined number of switching cells are activated to the current path for a determined period on-time $T_{on}$. When the determined period on-time $T_{on}$ is expired, all the switching cells of the arm in question are activated to the current path for a period of blanking time $t_b$. After the blanking time, the new switching period is started and the operation continues.

In known manner, a sorting algorithm may be used to balance the cell voltages within an arm. Further, the arm voltage, i.e. the sum of capacitor voltages in an arm is also maintained within a given deviation. The capacitance of the switching cell capacitor may be calculated with the equation $$C_{cell} = I_{pk}T_s/(\delta V_{cell}V_{DC}/n)$$

in which $I_{pk}$ is the maximum peak current $T_s$ is the duration of the switching period $\delta V_{cell}$ is the nominal voltage deviation allowed to the cell $V_{DC}$ is the half of the DC link voltage, and n is the number of switching cells in an arm.

As mentioned the duration of the resonance period is known, and thus the peak current depends on the difference between $V_{DC}$ and the arm voltage.

In the converter, the resonance circuit is undamped, thus there are no resistors added to the current path. With almost zero resistance, almost all energy delivered to the arm is transferred back to the DC link during the blanking time.

In the operation, the DC link operates as an energy buffer, while the arms are responsible for the voltage shaping and do not need act as energy storages as in modular-multilevel converters, for example. During on-time $T_{on}$, the energy is delivered from the DC link largely to the output terminal, and only partly to the capacitors in the arm. During the blanking time, the energy is fed back from the arm to the DC link using the resonance.

Upper switch S2 and lower switch S3 switching function is related to the power factor. If, for example, the power factor is 1, the switches are operated at a fundamental frequency.

Further, the upper and the lower switches S2, S3 may have zero-voltage turn-off, as the switches are always turned off by the conduction of the antiparallel diode.

According to an embodiment, the switching cells in the arm are activated one by one with a short time period between each activation. When the cells are not activated at the same time, the output voltage does not change in one step to the required value. When activated in consecutive manner, the change rate of the output voltage can be controlled. The reduced dV/dt may have reduce the EMI frequencies and reduce voltage reflections when long output cables are used.

The fact of having the DC link as an energy buffer instead of capacitors of the switching cells enables to operate the converter according to an embodiment for driving a motor with a low frequency. In the converter according to an embodiment, the fundamental frequency is completely decoupled from the converter capacitor energy, as only the switching frequency and the ratings have an impact.

It will be obvious to a person skilled in the art that, as the technology advances, the inventive concept can be implemented in various ways. The invention and its embodiments are not limited to the examples described above but may vary within the scope of the claims.

The invention claimed is:

1. A converter comprising:
    a DC link capacitor with a center point;
    an upper arm and a lower arm, both arms comprising switching cells connected in series, each switching cell having a capacitor and a bridge circuit to by-pass the capacitor or to set the capacitor in the series connection;
    an upper switch connected in series with the upper arm;

a lower switch connected in series with the lower arm,
wherein the upper switch and the lower switch are connected together and the connection point forms an output voltage terminal, and wherein the series connection of the upper arm, the upper switch, the lower switch and the lower arm is connected in parallel with the DC link capacitor,
the converter further comprising an upper valve component and a lower valve component, wherein the upper valve component is connected to a point between the upper arm and the upper switch and to the center point of the DC link capacitor, and wherein the lower valve component is connected to a point between the lower arm and the lower switch and to the center point of the DC link capacitor, the valve components being arranged such that the upper valve component allows current from the center point of the DC link capacitor towards the upper arm and the lower valve component allows current from the lower arm towards center point of the DC link capacitor, wherein a current path through the upper valve component and/or the lower valve component comprises inductance to form a resonance circuit,
wherein the converter further comprises a controller configured to:
obtain a voltage reference;
determine the number of switching cells required to obtain an output voltage corresponding to the voltage reference;
connect the determined amount of capacitors of the switching cells to the current path for s determined on time period; and
after the determined on time period, connect capacitors of all the switching cells to the current path for the duration of a blanking time.

2. The converter of claim 1, wherein the inductance is a discrete inductive component connected to the current path.

3. The converter of claim 1, wherein the resonance circuit includes the DC link capacitor and the capacitors of the switching cells.

4. The converter of claim 1, wherein the inductance is a parasitic inductance due to the layout of the current path.

5. The converter of claim 1, wherein the upper and lower valve components are diodes.

6. The converter of claim 1, wherein the upper and lower valve components are controllable switch components.

7. The converter of claim 1, wherein each of the upper switch and the lower switch consist of a single switch component.

8. The converter of claim 1, wherein each of the upper switch and the lower switch comprises a series connection of switch components.

9. The converter of claim 1, wherein the switching cells in the arms are adapted to be activated one by one with a short time period between each activation.

10. A method of operating a converter comprising:
a DC link capacitor with a center point;
an upper arm and a lower arm, both arms comprising switching cells connected in series, each switching cell having a capacitor and a bridge circuit to by-pass the capacitor or to set the capacitor in the series connection;
an upper switch connected in series with the upper arm;
a lower switch connected in series with the lower arm,
wherein the upper switch and the lower switch are connected together and the connection point forms an output voltage terminal, and wherein the series connection of the upper arm, the upper switch, the lower switch and the lower arm is connected in parallel with the DC link capacitor,
the converter further comprising an upper valve component and a lower valve component, wherein the upper valve component is connected to a point between the upper arm and the upper switch and to the center point of the DC link capacitor, and wherein the lower valve component is connected to a point between the lower arm and the lower switch and to the center point of the DC link capacitor, the valve components being arranged such that the upper valve component allows current from the center point of the DC link capacitor towards the upper arm and the lower valve component allows current from the lower arm towards center point of the DC link capacitor, wherein a current path through the upper valve component and/or the lower valve component comprises inductance to form a resonance circuit, and
wherein the method comprises:
obtaining a voltage reference;
determining the number of switching cells required to obtain an output voltage corresponding to the voltage reference;
connecting the determined amount of capacitors of the switching cells to the current path for a determined on-time period; and
after the determined on-time period, connecting capacitors of all the switching cells to the current path for the duration of a blanking time.

* * * * *